US005347650A

United States Patent [19]
Arditti et al.

[11] Patent Number: 5,347,650
[45] Date of Patent: Sep. 13, 1994

[54] DEVICE FOR TRANSFORMING A DIGITAL DATA SEQUENCE INTO A CONDENSED DIGITAL DATA BLOCK USING TABLES AND LOGIC OPERATORS

[75] Inventors: David Arditti; Mireille Campana, both of Clamart; Henri Gilbert, Bures Sur Yvette, all of France

[73] Assignee: France Telecom, Paris, France

[21] Appl. No.: 672,649

[22] Filed: Mar. 21, 1991

[30] Foreign Application Priority Data

Mar. 26, 1990 [FR] France .............................. 90 03831

[51] Int. Cl.$^5$ ..................... G06F 7/14; G06F 9/355; G06F 9/42; G06F 15/40
[52] U.S. Cl. ............................... 395/600; 364/232.22; 364/232; 364/239.3; 364/242.91; 364/245.9; 364/247.5; 364/253.1; 364/256.4; 364/256.8; 364/259; 364/259.1; 364/259.4; 364/259.5; 364/260.6; 364/260.7; 364/260.81; 364/265.2; 364/282.1
[58] Field of Search ............... 395/800, 200, 275, 425, 395/600, 400, 375, 500, 775, 250, 650, 700, 575; 364/DIG. 1, DIG. 2, 419.12; 341/51, 55, 87; 358/133; 380/23; 235/380

[56] References Cited

U.S. PATENT DOCUMENTS

| | | | |
|---|---|---|---|
| 4,309,569 | 1/1982 | Merkle | 178/22.08 |
| 4,558,302 | 12/1985 | Welch | 341/51 |
| 4,730,348 | 3/1988 | MacCrisken | 395/200 |
| 4,862,167 | 8/1989 | Copeland, III | 341/107 |
| 4,885,777 | 12/1989 | Takaragi et al. | |
| 4,906,991 | 3/1990 | Fiala et al. | 341/51 |
| 4,908,521 | 3/1990 | Boggan et al. | 235/380 |
| 4,979,039 | 12/1990 | Kisor et al. | 358/133 |
| 5,140,321 | 8/1992 | Jung | 341/55 |
| 5,146,221 | 9/1992 | Whiting et al. | 341/67 |
| 5,182,799 | 1/1993 | Tamula et al. | 395/400 |
| 5,218,637 | 6/1993 | Angebaud et al. | 380/23 |

*Primary Examiner*—Alyssa H. Bowler
*Assistant Examiner*—Daniel H. Pan
*Attorney, Agent, or Firm*—Foley & Lardner

[57] ABSTRACT

An electronic device for processing digital data has an input for receiving data to be processed and processor means suitable for transforming the input data in non-falsifiable manner into a result condensed data block. The processor means tools that are simple and fast, such as arrays and logic operators, to provide an elementary anti-collision operation for use in condensing the digital data.

7 Claims, 7 Drawing Sheets

| Q1M \ Q1V | Q1V1 | 2 | 3 | 4 | 5 | 6 | 7 | 8 | 9 | 10 | 11 | 12 | 13 | 14 | 15 | Q1V16 |
|---|---|---|---|---|---|---|---|---|---|---|---|---|---|---|---|---|
| Q1M1 | 16 | 21 | 26 | 25 | 28 | 5 | 4 | 31 | 32 | 12 | 9 | 11 | 7 | 6 | 13 | 20 |
| 2 | 32 | 19 | 21 | 3 | 4 | 5 | 2 | 7 | 9 | 24 | 6 | 11 | 30 | 13 | 14 | 15 |
| 3 | 13 | 7 | 2 | 25 | 18 | 19 | 8 | 4 | 23 | 9 | 10 | 5 | 12 | 14 | 21 | 27 |
| 4 | 20 | 9 | 21 | 2 | 4 | 7 | 19 | 8 | 3 | 13 | 31 | 26 | 17 | 16 | 30 | 22 |
| 5 | 20 | 2 | 3 | 6 | 30 | 27 | 5 | 16 | 7 | 25 | 22 | 9 | 29 | 15 | 13 | 24 |
| 6 | 11 | 27 | 23 | 13 | 17 | 15 | 7 | 5 | 20 | 3 | 10 | 32 | 19 | 25 | 8 | 31 |
| 7 | 26 | 13 | 6 | 17 | 19 | 1 | 29 | 27 | 20 | 15 | 10 | 32 | 25 | 31 | 14 | 24 |
| 8 | 7 | 1 | 22 | 2 | 32 | 12 | 10 | 28 | 6 | 4 | 29 | 13 | 8 | 11 | 14 | 17 |
| 9 | 9 | 16 | 29 | 7 | 5 | 31 | 24 | 30 | 6 | 18 | 17 | 27 | 8 | 14 | 15 | 32 |
| 10 | 11 | 29 | 16 | 2 | 7 | 20 | 14 | 13 | 1 | 24 | 6 | 32 | 28 | 22 | 10 | 3 |
| 11 | 32 | 16 | 25 | 8 | 5 | 23 | 21 | 29 | 19 | 2 | 1 | 3 | 20 | 6 | 24 | 13 |
| 12 | 9 | 13 | 2 | 15 | 5 | 1 | 11 | 6 | 23 | 19 | 12 | 17 | 22 | 18 | 8 | 27 |
| 13 | 26 | 15 | 25 | 24 | 21 | 29 | 6 | 12 | 10 | 18 | 17 | 32 | 30 | 27 | 9 | 16 |
| 14 | 13 | 6 | 7 | 29 | 26 | 17 | 31 | 2 | 25 | 24 | 10 | 32 | 4 | 27 | 20 | 23 |
| 15 | 3 | 24 | 32 | 16 | 11 | 18 | 25 | 31 | 7 | 23 | 14 | 22 | 2 | 5 | 1 | 12 |
| Q1M16 | 16 | 19 | 30 | 6 | 2 | 10 | 15 | 23 | 27 | 28 | 1 | 21 | 18 | 17 | 25 | 3 |

FIG.3   Q1

| Q2M \ Q2V | Q2V1 | 2 | 3 | 4 | 5 | 6 | 7 | 8 | 9 | 10 | 11 | 12 | 13 | 14 | 15 | Q2V16 |
|---|---|---|---|---|---|---|---|---|---|---|---|---|---|---|---|---|
| Q2M1 | 14 | 23 | 2 | 19 | 8 | 1 | 17 | 18 | 29 | 10 | 15 | 30 | 24 | 22 | 3 | 27 |
| 2 | 16 | 8 | 12 | 29 | 20 | 10 | 22 | 23 | 18 | 25 | 26 | 27 | 28 | 31 | 1 | 17 |
| 3 | 22 | 11 | 28 | 3 | 26 | 20 | 29 | 31 | 6 | 16 | 30 | 17 | 15 | 32 | 1 | 24 |
| 4 | 6 | 10 | 18 | 1 | 11 | 32 | 5 | 23 | 24 | 25 | 15 | 27 | 28 | 29 | 14 | 12 |
| 5 | 21 | 4 | 11 | 17 | 8 | 12 | 28 | 10 | 31 | 14 | 18 | 23 | 26 | 1 | 19 | 32 |
| 6 | 29 | 18 | 2 | 6 | 1 | 16 | 4 | 30 | 14 | 21 | 24 | 12 | 28 | 26 | 9 | 22 |
| 7 | 22 | 18 | 2 | 8 | 23 | 30 | 21 | 5 | 11 | 7 | 28 | 3 | 16 | 9 | 4 | 12 |
| 8 | 16 | 3 | 21 | 19 | 30 | 9 | 31 | 23 | 24 | 25 | 15 | 20 | 5 | 18 | 27 | 26 |
| 9 | 28 | 26 | 10 | 22 | 2 | 23 | 4 | 12 | 19 | 3 | 21 | 1 | 25 | 11 | 20 | 13 |
| 10 | 31 | 19 | 18 | 15 | 27 | 8 | 21 | 17 | 4 | 26 | 30 | 5 | 12 | 23 | 25 | 9 |
| 11 | 15 | 22 | 17 | 4 | 14 | 10 | 31 | 27 | 12 | 18 | 11 | 28 | 7 | 9 | 30 | 26 |
| 12 | 7 | 28 | 32 | 21 | 31 | 10 | 26 | 14 | 24 | 30 | 3 | 20 | 4 | 29 | 16 | 25 |
| 13 | 4 | 5 | 28 | 14 | 8 | 23 | 7 | 31 | 11 | 20 | 2 | 1 | 22 | 19 | 13 | 3 |
| 14 | 30 | 1 | 5 | 12 | 15 | 19 | 16 | 11 | 18 | 9 | 22 | 8 | 28 | 21 | 3 | 14 |
| 15 | 6 | 15 | 17 | 13 | 19 | 4 | 21 | 28 | 10 | 30 | 8 | 29 | 27 | 9 | 26 | 20 |
| Q2M16 | 11 | 26 | 9 | 29 | 14 | 32 | 8 | 5 | 4 | 24 | 20 | 13 | 12 | 7 | 22 | 31 |

| P1\P2 | 1 | 2 | 3 | 4 | 5 | 6 | 7 | 8 |
|---|---|---|---|---|---|---|---|---|
| 1 | 237 | 210 | 216 | 199 | 177 | 20 | 248 | 194 |
| 2 | 195 | 95 | 18 | 171 | 244 | 65 | 76 | 238 |
| 3 | 174 | 7 | 100 | 129 | 21 | 170 | 172 | 243 |
| 4 | 67 | 122 | 39 | 188 | 1 | 185 | 227 | 38 |
| 5 | 159 | 152 | 93 | 213 | 215 | 60 | 6 | 212 |
| 6 | 203 | 175 | 77 | 61 | 5 | 207 | 138 | 19 |
| 7 | 121 | 33 | 4 | 42 | 147 | 191 | 82 | 40 |
| 8 | 155 | 56 | 236 | 43 | 220 | 11 | 98 | 253 |
| 9 | 225 | 79 | 169 | 108 | 222 | 218 | 14 | 140 |
| 10 | 94 | 190 | 233 | 17 | 80 | 131 | 189 | 151 |
| 11 | 196 | 24 | 31 | 126 | 181 | 123 | 184 | 90 |
| 12 | 64 | 13 | 25 | 133 | 254 | 186 | 144 | 161 |
| 13 | 44 | 27 | 66 | 166 | 226 | 106 | 63 | 252 |
| 14 | 113 | 124 | 255 | 85 | 57 | 36 | 135 | 209 |
| 15 | 105 | 48 | 163 | 230 | 22 | 146 | 187 | 117 |
| 16 | 34 | 145 | 141 | 247 | 223 | 239 | 75 | 219 |
| 17 | 148 | 180 | 157 | 128 | 23 | 179 | 205 | 228 |
| 18 | 168 | 89 | 41 | 69 | 2 | 251 | 249 | 30 |
| 19 | 250 | 103 | 51 | 54 | 55 | 197 | 37 | 242 |
| 20 | 115 | 110 | 119 | 162 | 167 | 137 | 200 | 9 |
| 21 | 201 | 46 | 8 | 86 | 130 | 202 | 84 | 114 |
| 22 | 87 | 208 | 112 | 127 | 158 | 256 | 221 | 111 |
| 23 | 99 | 101 | 150 | 241 | 50 | 118 | 70 | 58 |
| 24 | 240 | 120 | 232 | 104 | 74 | 156 | 83 | 68 |
| 25 | 149 | 165 | 26 | 35 | 176 | 217 | 134 | 78 |
| 26 | 59 | 97 | 45 | 71 | 16 | 72 | 234 | 182 |
| 27 | 92 | 224 | 229 | 160 | 88 | 193 | 12 | 47 |
| 28 | 52 | 142 | 178 | 29 | 164 | 214 | 73 | 62 |
| 29 | 109 | 204 | 143 | 81 | 125 | 139 | 107 | 211 |
| 30 | 91 | 231 | 28 | 32 | 10 | 235 | 116 | 183 |
| 31 | 132 | 198 | 192 | 53 | 136 | 154 | 173 | 15 |
| 32 | 206 | 49 | 153 | 102 | 96 | 245 | 3 | 246 |

FIG.6

| TV/TM | TV1 | 2 | 3 | 4 | 5 | 6 | 7 | 8 | 9 | 10 | 11 | 12 | 13 | 14 | 15 | TV16 |
|---|---|---|---|---|---|---|---|---|---|---|---|---|---|---|---|---|
| TM1 | 0xc6 | 0x87 | 0xff | 0x5c | 0x7a | 0x4d | 0xbb | 0xfd | 0x42 | 0xfb | 0x96 | 0x07 | 0xe2 | 0x11 | 0x07 | 0xc7 |
| 2 | 0x56 | 0xa6 | 0x48 | 0xe6 | 0xf4 | 0xc0 | 0x15 | 0xdb | 0xd2 | 0xe5 | 0xb3 | 0xa1 | 0x64 | 0xf1 | 0x33 | 0xaa |
| 3 | 0x6a | 0x2a | 0xf7 | 0x12 | 0x08 | 0x91 | 0x75 | 0x18 | 0x36 | 0x7a | 0x3b | 0xc9 | 0x5a | 0x5f | 0x32 | 0xfd |
| 4 | 0x32 | 0xf0 | 0x26 | 0x87 | 0xf7 | 0x6d | 0x85 | 0xa7 | 0xbf | 0x38 | 0x66 | 0xc3 | 0x22 | 0xa5 | 0xcd | 0x56 |
| 5 | 0x20 | 0x15 | 0x2d | 0x28 | 0x41 | 0x42 | 0x2d | 0xbf | 0xfe | 0xdb | 0xae | 0x15 | 0x5f | 0x53 | 0x0d | 0x8a |
| 6 | 0xe5 | 0xf5 | 0xa5 | 0x1b | 0xa9 | 0x3b | 0x97 | 0xd4 | 0xc4 | 0x60 | 0xcc | 0x83 | 0xf1 | 0x34 | 0x3b | 0xae |
| 7 | 0x71 | 0x2e | 0x67 | 0xc6 | 0x2e | 0xc7 | 0x2b | 0x9b | 0x23 | 0x05 | 0xb9 | 0x13 | 0xfa | 0x55 | 0xdf | 0x16 |
| 8 | 0xf6 | 0x9d | 0x8c | 0xcc | 0x13 | 0x92 | 0x93 | 0x0a | 0x6a | 0x46 | 0xae | 0x09 | 0xda | 0x04 | 0xc4 | 0x58 |
| 9 | 0xe5 | 0x5f | 0x6e | 0x13 | 0xd7 | 0x88 | 0xb7 | 0x55 | 0x2c | 0xe0 | 0x23 | 0xea | 0x33 | 0xce | 0xf2 | 0x49 |
| 10 | 0xee | 0xd1 | 0xa5 | 0xc0 | 0x3c | 0xd8 | 0xc1 | 0xf1 | 0x39 | 0xd1 | 0xd2 | 0x7c | 0xe5 | 0x7f | 0xb2 | 0xfd |
| 11 | 0x03 | 0x90 | 0x0b | 0x38 | 0x43 | 0xee | 0x19 | 0x93 | 0xa2 | 0x55 | 0xb4 | 0xc4 | 0x11 | 0x25 | 0x8d | 0xca |
| 12 | 0x54 | 0x78 | 0xb7 | 0x20 | 0x2d | 0x77 | 0x69 | 0x30 | 0xb9 | 0xe9 | 0x02 | 0x05 | 0x18 | 0x0c | 0x4c | 0x45 |
| 13 | 0x53 | 0xa8 | 0x04 | 0x5d | 0x7a | 0x60 | 0x99 | 0xfd | 0x0d | 0x4a | 0x34 | 0xc7 | 0x9d | 0xc2 | 0xf8 | 0x42 |
| 14 | 0xb1 | 0x7b | 0x8a | 0x14 | 0xed | 0xd6 | 0xd3 | 0x70 | 0x70 | 0x76 | 0x04 | 0xcd | 0x7e | 0x14 | 0xda | 0xd8 |
| 15 | 0x5f | 0x8f | 0x23 | 0xaa | 0x86 | 0x46 | 0x80 | 0x3d | 0xf4 | 0xaa | 0x6b | 0x1c | 0xde | 0x0e | 0x7b | 0x59 |
| TM16 | 0x8d | 0xc0 | 0xe6 | 0xc4 | 0x85 | 0x5d | 0x48 | 0x59 | 0xe9 | 0x61 | 0xa2 | 0xfa | 0x1d | 0xfd | 0xa4 | 0x5d |

DEVICE FOR TRANSFORMING A DIGITAL DATA SEQUENCE INTO A CONDENSED DIGITAL DATA BLOCK USING TABLES AND LOGIC OPERATORS

The invention relates to condensing digital data. It is applicable to protecting the integrity of digital data.

BACKGROUND OF THE INVENTION

The person skilled in the art understands the term "condensation" to designate a non-falsifiable transformation of an initial digital data sequence into a resulting condensed digital data block. The term "condensed" can be explained by the fact that the resulting condensed digital data block is much shorter than the initial digital data sequence.

The transformation is said to be non-falsifiable (or anti-collision) when it is not possible in practice with the calculation means actually available to discover two different digital data sequences that lead to the same condensed block and thus, in particular, given a first digital data sequence, to find a second digital data sequence distinct from the first sequence and producing the same condensed block.

In general, the person skilled in the art uses the anti-collision property of the condensation transformation to protect the integrity of digital data, and in particular to detect anomalies (changes, inversions, omissions, or additions of digital data) that may be of accidental origin (hardware errors) or of deliberate origin (deliberate fraudulent manipulations) to which the digital data may be subject. For example, for computer files stored on some medium, the person skilled in the art calculates the condensed block of the computer file to be protected and stores said condensed block in non-volatile memory. Each time the computer file is reused, the person skilled in the art calculates its condensed block again and then compares it with the condensed block as previously stored. The result of the comparison serves in theory to determine whether anomalies exist in the computer file to be protected.

Digital data may also be condensed for the purpose of signing computer messages. In this case the message to be signed is initially condensed and then a signature function making use of a secret is applied to the condensed block.

At present, digital data condensing operations are performed on the basis of encrypting algorithms such as the "Data Encryption Standard" (DES) algorithm in which the one-way dependence property on the encryption key confers the anti-collision property to the operation of condensing digital data.

The drawback of such encryption algorithms is the slowness with which they are performed when implemented purely in software.

In the document "Design Principles For Hash Functions" by I. B. Damgard, Proceeding of Crypto 89, Aug. 1989, a solution is proposed for constructing a condensation function operating on a digital data sequence of arbitrary size on the basis of elementary anti-collision functions operating on digital data blocks of fixed size, namely "hash functions". More precisely, that document suggests using schemes for calculating condensed blocks that are of the type suitable for being performed in parallel, being broken down into a plurality of calculation modules each performing an elementary anti-collision function. However, that document does not describe any effective construction for performing an elementary anti-collision operation, both quickly and efficiently for the purpose of condensing digital data.

The present invention seeks specifically to provide a solution to this problem.

A first aim of the invention is to provide a device for condensing digital data which is based on tools that are fast and simple, such as tables and logic operators.

Another aim of the invention is to provide a data condensation device for digital data sequences of arbitrary length.

Yet another aim of the invention is to apply the data condensation device to devices that are intended to protect the integrity of digital data, such as certification devices or electronic signature devices.

SUMMARY OF THE INVENTION

The present invention provides an electronic device for processing digital data, the device comprising:
an input for receiving data to be processed; and
processor means suitable for transforming the input data in non-falsifiable manner into a result condensed data block;
wherein the processor means comprise:
means for breaking up the input data into at least a first group comprising M first input words of respective ranks I lying in the range 1 to M, each constituted by the same number B of elementary data items, and a second group comprising M second input words of respective ranks I lying in the range 1 to M, and each constituted by the same number B of elementary data items;
first means forming an array having two entries of sizes M and V where V is a predetermined value representative of the upper limit for a processing index K, the contents of the cells in the array having integer values lying in the range 1 to 2M;
second means forming an array having two entries of respective sizes M and V, having cells whose contents take integer values lying in the range 1 to 2M;
third means forming an array having two entries of respective sizes V and M, with cells containing integer values lying in the range 1 to $2^B$ to define a table of V.M auxiliary words; and
a composite operator suitable for providing a special function having two entries of the same size B, performing an EXCLUSIVE OR operation on these entries followed by a nonlinear permutation on the result of said EXCLUSIVE OR operation;
and wherein the processor means are suitable for:
a) initializing the processing index K to 1;
b) establishing an initial value of a current intermediate word at rank I equal to 1;
c) initializing the rank I to 2;
d) replacing the input word of the first group of rank I by the input word whose group and rank are defined by the contents of the cell in the first array whose entry address of size M is equal to the rank I, thus obtaining a first substitute word;
e) replacing the input word of the second group of rank I by the input word whose group and rank are defined by the contents of the cell of the second array whose entry address of size M is equal to the rank I, thereby obtaining a second substitute word;
f) applying the current second substitute word and the auxiliary word contained in the cell of the auxiliary table whose entry address of size M has a value equal to the rank I to respective entries of the composite operator, thereby obtaining a first term word;

g) applying the current first substitute word and the first term word to respective entries of the composite operator, thereby obtaining a second term word;

h) applying the current intermediate word and the second term word to respective entries of the composite operator, thereby obtaining a new current intermediate word;

i) repeating operations d) to h) selectively, each time incrementing the rank I until the value M is reached, thereby obtaining a result word of B elementary data items for a processing index of value K;

j) selectively repeating operations b) to i), each time incrementing the processing index until it reaches its upper limit, thereby obtaining a result condensed data block of V result words each comprising B elementary data items.

In a particular embodiment of the invention, the processor means, in order to establish the initial value of a current intermediate word for a rank I equal to 1, are suitable for:

replacing the input word of the first group of rank I by the input word whose group and rank are defined by the contents of the cell in the first array whose entry address of size M is equal to the rank I, thereby giving a third current substitute word;

replacing the input word of the second group of rank I by the input word whose group and rank are defined by the contents of the cell of the second array whose address of the entry of size M is equal to the rank I, thus giving a fourth substitute word;

applying the fourth current substitute word and the auxiliary word contained in the cell of the auxiliary table whose address in the entry of size M has a value equal to the rank I to respective entries of the composite operator, thus providing a third term word; and applying the third current substitute word and the third term word to respective entries of the composite operator, thereby obtaining the initial intermediate word for a rank 1.

In practice, the upper limit V of the processing index K is equal to M.

In a preferred embodiment of the invention, the composite operator possesses a third array having two entries of sizes $2^{B1}$ to $2^{B2}$ respectively, such that B1 and B2 are non-zero integers whose sum is equal to B, the array having cells whose contents have values lying in the range 1 to $2^B$ suitable for defining a non-linear permutation on the $|0, 1|$ order B product set extended to 2.M words, and an EXCLUSIVE OR type operator having two entries of the same size B, the output from the EXCLUSIVE OR operator interacting with the entries of the third array to provide the special functions.

In practice, when the length of the set of data to be processed is not equal to 2.M.B elementary data items, the device further includes additional processing means comprising:

means for padding out the value of the length of the set of data to be processed to obtain a length equal to a multiple of M.B elementary data items and greater than 2 M.B elementary data items, thereby enabling a plurality of groups to be obtained each comprising M words respectively formed of a number B of elementary data items;

means suitable for selectively repeating operations a) to j) by applying on each occasion a pair of word groups of M.B elementary data items until only one result word group is obtained having M.B elementary data items;

said result word group being said results condensed data block.

Advantageously, the length of the set of data to be processed is padded out to reach the smallest length that is even and equal to the product of M.B multiplied by an integer power of two, and the selective repetition of operations a) to j) on the plurality of groups of words comprising M.B elementary data items takes place in accordance with an inverse binary tree.

The present invention also provides for the application of the device of the invention to certification devices or digital data signature devices.

BRIEF DESCRIPTION OF THE DRAWINGS

Embodiments of the invention are described by way of example with reference to the accompanying drawings, in which:

FIGS. 3 and 4 are two two-entry tables having entries of sizes M and V suitable together for defining V permutations on the set $|1, 2M|$;

DETAILED DESCRIPTION

Figure 1:
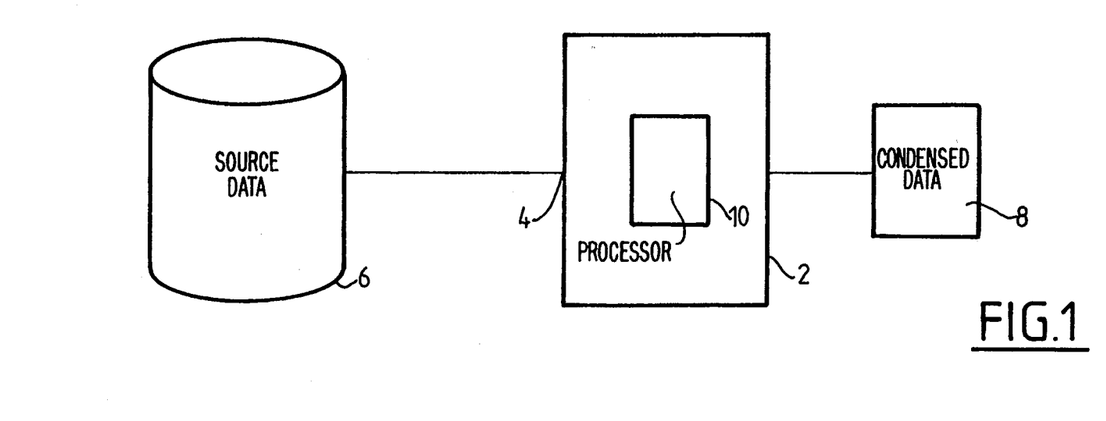
FIG. 1 is a block diagram of a digital data condensation device of the invention.

In FIG. 1, the electronic digital data processing device 2 of the invention includes an input 4 for receiving data to be processed 6. Processor means 10 within the electronic device 2 transform the input data in non-reversible manner into a resulting condensed data block 8.

Figure 2:
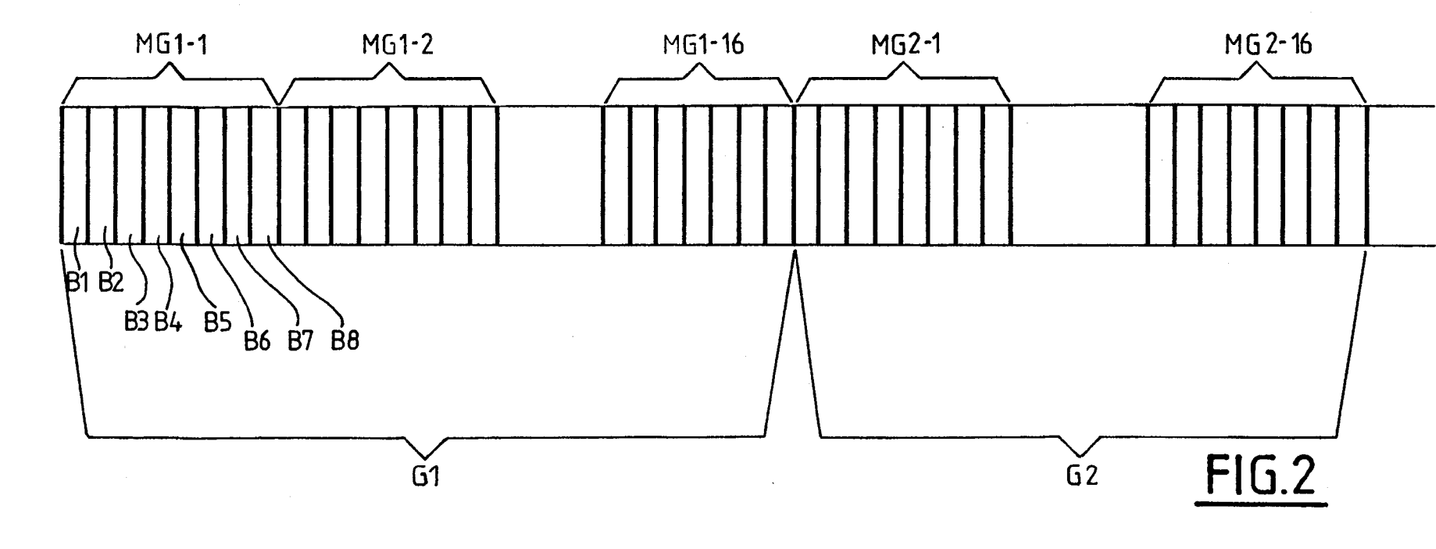
FIG. 2 is a diagram showing how digital data to be processed is broken down.

FIG. 2 shows a sequence of digital data to be processed. The processor means 10 of the device of the invention begin by breaking down the input data at least into a first group G1 comprising M first input words MG1-I of respective ranks I lying in the range 1 to M and each constituted by the same number B of elementary data items, and a second group G2 comprising M second input words MG2-I of respective rank I lying in the range 1 to M, and each constituted by the same number B of elementary data items.

In this case, the data are shown broken down into a group G1 comprising 16 words (MG1-1 to MG1-16 and a group G2 of 16 words (MG2-1 to MG2-16). In this case the words MG1-1 to MG2-16 are 8-bit bytes (B1 to B8), so in this case the "elementary data items" are binary digits (bits).

According to the invention, the device applies a non-reversible transformation on these two groups of words G1 and G2 to obtain a resulting condensed data block C of length M.B.

According to the invention, the device performs this nonreversible transformation using processor means comprising tools that are simple and fast, and requiring little calculation memory.

FIG. 3 shows the first one of these tools. It comprises an array Q1 having two entries Q1M and Q1V of respective sizes M and V. In this case M is equal to 16 while the value of V represents the upper limit of a processing index K. In this case V is also equal to 16. Entry Q1M is specified by an address in the range Q1M1 to Q1MM where M lies in the range 1 to 16. Similarly, entry Q1V is specified by an address in the range Q1V1 to Q1VV where V lies in the range 1 to 16 in this case.

The array Q1 comprises cells whose contents lie in the range 1 to 2M.

FIG. 4 shows the second one of these tools. This is another array Q2 having two entries Q2M and Q2V of respective sizes M and V. The contents of the cells have values lying in the range 1 to 2M. A specific entry Q2V is given by an address in the range Q2V1 to Q2VV where V lies in the range 1 to 16. Similarly, a specific entry Q2M is given by an address in the range Q2M1 to Q2MM where M lies in the range 1 to 16, in this case. The cells in arrays Q1 and Q2 serve together to define V permutations on the set $|1, 2M|$.

Figure 5:
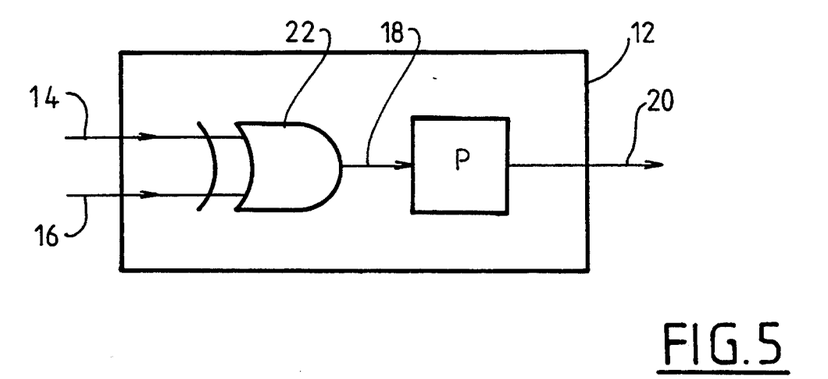
FIG. 5 is a diagram of a composite operator possessing an array having two entries of sizes 2M and B, and an EXCLUSIVE OR operator having two entries of size B.

FIG. 5 shows the third one of these tools. This is a composite operator 12 providing a special function having two same size (B) entries 14 and 16, performing an EXCLUSIVE OR operation on these entries, followed by a non-linear permutation on the result 18 of said EXCLUSIVE OR operation.

More precisely, the composite operator 12 possesses an operator of the EXCLUSIVE OR type 22 and an array P having two entries P1 and P2 for cells whose contents have values lying in the range 1 to 256 ($2^8$). The output 18 from the EXCLUSIVE OR operator 22 interacts with the entries P1 and P2 of the array P to provide the special function.

Figure 6:
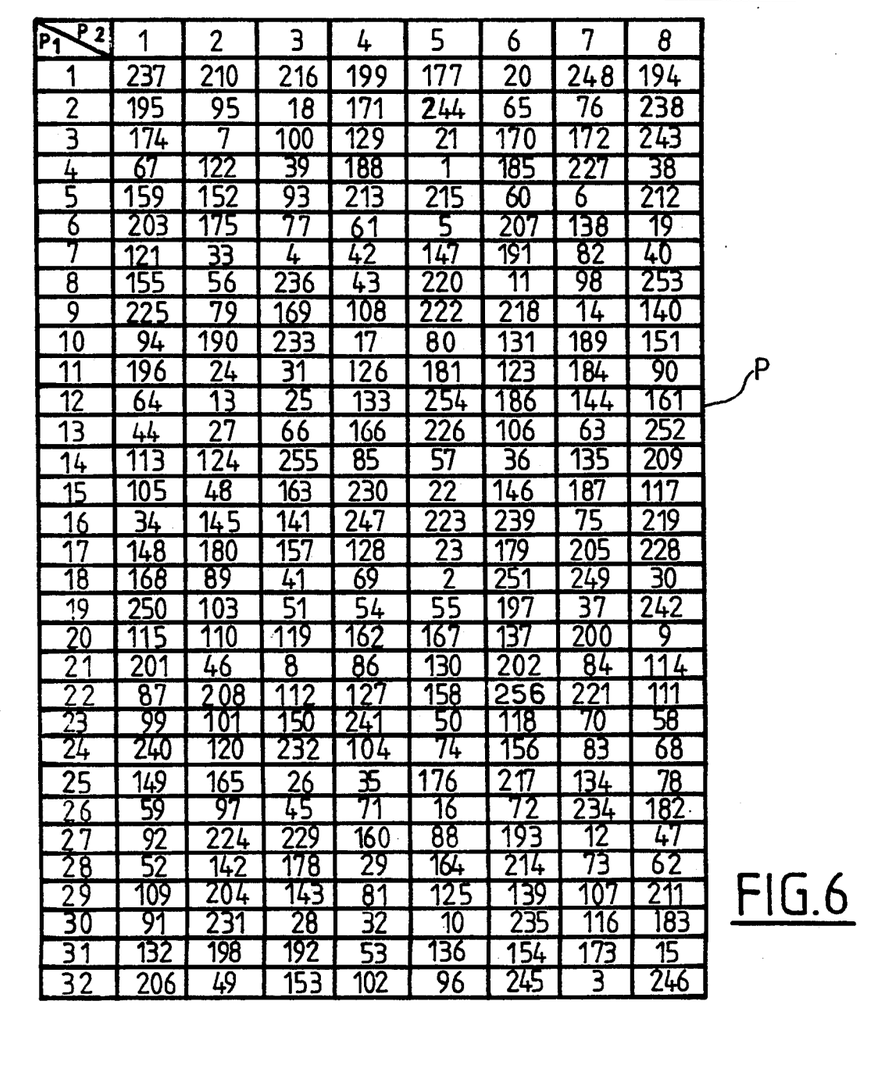
FIG. 6 is a table representative of an array having two entries respectively of sizes P1 and P2 for cells suitable for defining a non-linear permutation on the 51 $0, 1|$ order B product set extended to 2.M words.

FIG. 6 shows a table representative of the array P. The array P is an array having two entries P1 and P2 of sizes $2^{B1}$ and $2^{B2}$, such that B1 and B2 being non-zero integers, the sum of the exponents B1 and B2 is equal to B. In this case B1 is equal to 5 ($2^5=32$) and B2 is equal to 3 ($2^3=8$). Naturally, B1 and B2 could have other values.

The cells in array P are suitable for defining a nonlinear permutation on the $|0, 1|$ order B product set extended to 2.M words, i.e. on a set of 2.M words each comprising B elementary data items, with the elementary data items (bits) taking values of 0 or 1.

Figure 7:
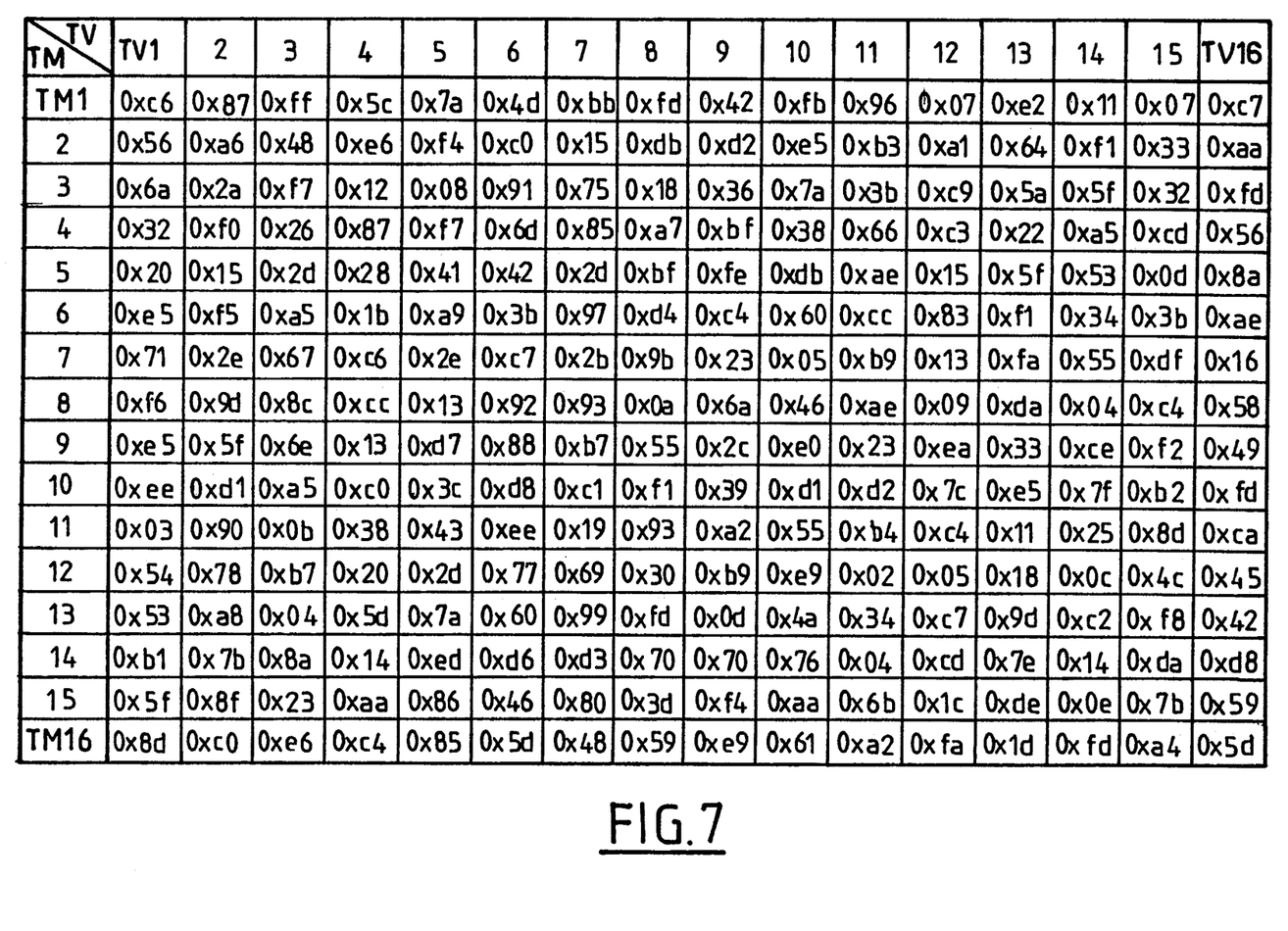
FIG. 7 is a table representative of an array having two entries of sizes M and V for cells whose contents possess values lying in the range 1 to 256 to define a table of V.M auxiliary words.

FIG. 7 shows the fourth one of these tools. This is an array T having two entries TM and TV respectively of sizes M and V. The contents of the cells in this array lie in the range 1 to 256 ($2^8$). This array defines a table of V.M constant auxiliary words. In this case, the contents of the cells is written in hexadecimal. A specific entry TM is given by an address in the range TM1 to TMM where M lies in the range 1 to 16. A specific entry TV is given by an address TV1 to TVM, with V lying in the range 1 to 16, in this case.

Figure 8:
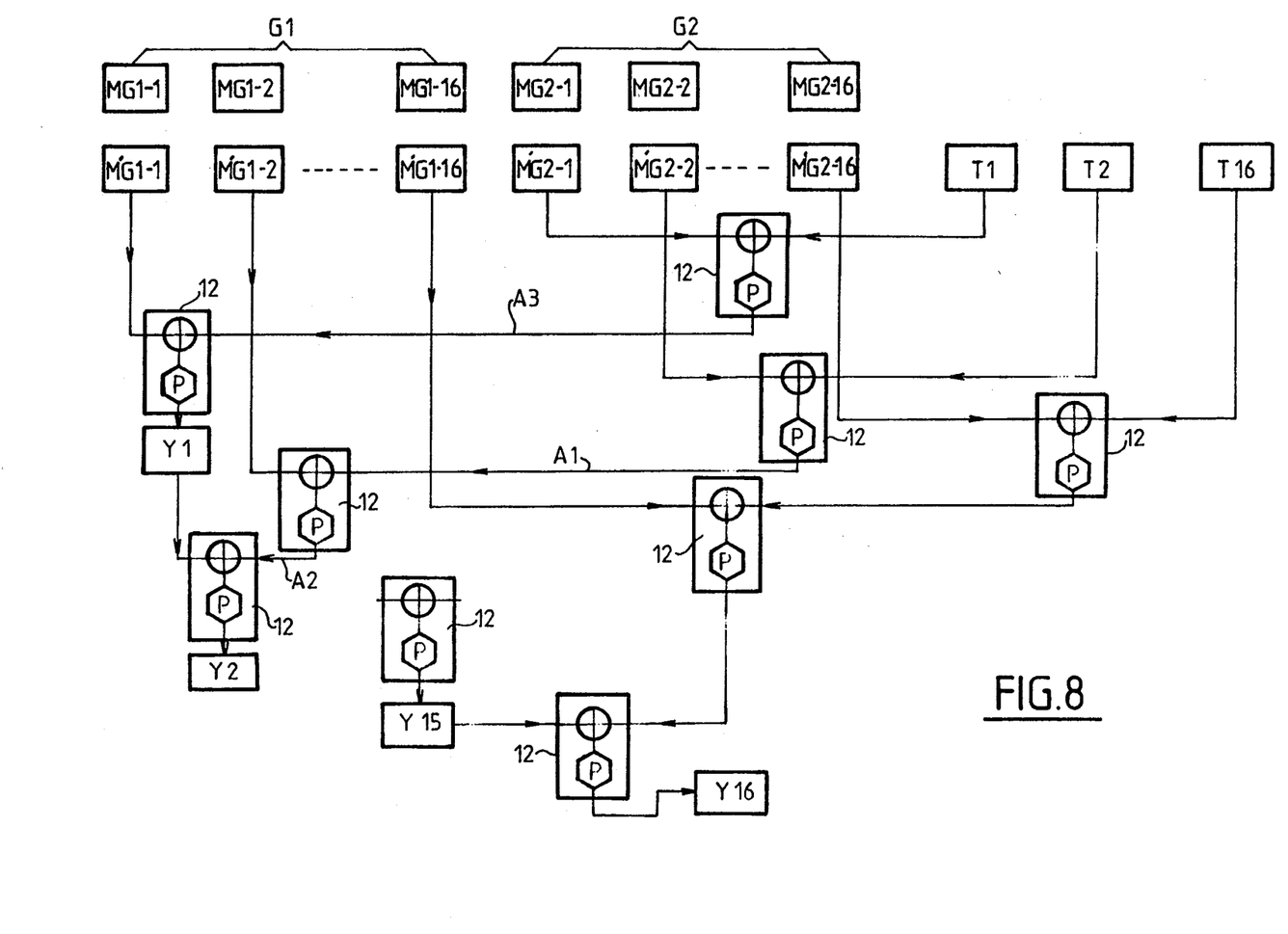
FIG. 8 is a diagram showing how the operation of the invention for condensing digital data takes place.

FIG. 8 shows the words MG1-1 to MG1-16 of group G1 and of respective ranks I lying in the range 1 to 16, and the words MG2-1 to MG2-16 of the group G2 and of repetitive ranks I lying in the range 1 to 16. The processor means 10 apply a digital data condensation operation on these two groups of words G1 and G2 to obtain a resulting condensed data block C having the same size as the Group G1 or the Group G2.

To do this, the processor means 10 begin by initializing the processing index K to the value 1. Thereafter, they establish an initial value for a current intermediate word Y1 of rank I equal to 1. Then, they initialize rank I to 2. Finally, they replace the word MG1-2 of the first group G1 of rank 1 (in this case I=2) by the input word whose Group and rank are defined by the contents of the cell of the first array Q1 having entry address of size M Q1M-2 equal to rank 2, thereby giving a first substitute word M'G1-2. Thus, the contents of the cell in Q1 at entry addresses Q1M-2 and Q1V-1 (in this case I=2 and K=1), i.e. 32 defines the group and the rank of the substitute word M'G1-2 which replaces MG1-2. Consequently, in this case, MG2-16 substitutes MG1-2 and becomes M'G1-2. In addition, input word MG2-2 of the second group G1 and of rank I (in this case I=2) is replaced by the input word whose group and rank are defined by the contents of the cell in the second array Q2 of entry address Q2M-2 in its entry of size M equal to rank 2, thereby giving a second substitute word M'G2-2.

Thus, the contents of the cell of Q2 at entry addresses Q2M-2 and Q2V-1 (in this case I=2 and K=1), i.e. 16 defines the group and the rank of the substitute word M'G2-2 which replaces the word MG2-2. Consequently, in this case MG1-16 substitutes MG2-2 and becomes M'G2-2.

Thereafter, the processor means apply the substitute word M'G2-2 and auxiliary word T2 contained in the cell of the auxiliary table whose entry address TM in its entry of size M has a value equal to the rank I (in this case I=2, and still for a processing index K=1), to respective entries of the composite operator 12, thereby obtaining a first term word A1.

Thereafter the substitute word M'G1-2 and the term word A1 are applied to the entries of the composite operator 12 thereby obtaining a second term word A2.

The previously-defined current intermediate word Y1 and the second term word A2 are then applied to respective entries of the composite operator 12 given a new current intermediate word Y2.

The previously-defined current intermediate word Y1 of rank I=1 and for a processing index K=1 is obtained after the following operations.

Firstly, input word MG1-1 of the first group G1 of rank 1 is replaced by the input word whose group and rank are defined by the contents of the cell in the first array Q1 at entry address Q1M-1 in its entry of size M equal to 1, thus giving a substitute word M'G1-1.

In this way, the contents of the cell in Q1 located at entry addresses Q1M-1 and Q1V-1 (in this case K=1 and I=1), i.e. 16 in this case, defines the group and the rank of the substitute word M'G1-1 that replaces MG1-1, consequently, in this case, MG1-16 substitutes MG1-1 and becomes M'G1-1.

In addition, input word MG2-1 of the second group G2 at rank 1 is replaced by the input word whose group and rank are defined by the contents of the cell of Q2 of entry address Q2M-1 in its entry of size M equal to rank 1, thus giving substitute word M'G2-1.

In this way, the contents of the cell of Q2 to be found at entry addresses Q2M-1 and Q2V-1 (in this case K=1 and I=1), i.e. 14, defines the group and the rank of the substitute word M'G2-1 which replaces MG2-1. Consequently, in this case, MG1-14 substitutes MG2-1 and becomes M'G2-1.

Thereafter, the substitute word M'G2-1 and the auxiliary word T1 contained in the cell whose entry address TM1 in its entry of size M has a value equal to rank 1 (for a processing index K=1) are applied to respective entries of the composite operator 12, thereby obtaining a term word A3.

Finally, the substitute word M'G1-1 and the term word A3 are applied to respective entries of the composite operator 12 thereby obtaining the initial intermediate word Y1.

All of these operations are repeated selectively, each time incrementing the rank I until reaching the value I=M, thereby making it possible to obtain a B-bit result word Y16.

Thus, for a selected processing index, in this case K=1, a result word Y16 is obtained which is representative of the words MG1-1 to MG2-16 in the two groups G1 and G2.

Finally, these operations are repeated selectively, incrementing each time the processing index K until the upper limit V of this processing index is reached, thereby obtaining V result words Y16 constituting the result condensed data block.

In this case, the upper limit V for the processing index K is equal to M, thus giving rise to a result condensed data block of M.B bits.

The non-falsification property of the transformation is due to the fact that each of the V result words Y16 depends on all of the words MG1-1 to MG2-16, in a manner which is unique and specific. Each of the words MG1-1 to MG2-16 takes part once only in calculating the V result words Y16. It should also be observed that when 2M-1 input words are fixed, the condensation function performs, for all K in the range 1 to 16, a bijection between the non-fixed input word and the corresponding result word Y16.

The digital data condensation operation described with reference to FIGS. 1 to 8 works on two operands of M.B bits each, to give a result of M.B bits.

The Applicants have set themselves the problem of applying this condensation operation to sets of data of arbitrary length.

The solution proposed by the Applicants consists initially in padding out the length of the set of data to be processed to obtain a value which is a multiple of M.B bits and which is greater than 2.M.B bits, and finally to repeat the above-described condensation operations selectively to each pair of groups formed by M.B bits.

Advantageously, padding out to obtain a length which is a multiple of M.B bits is done in such a way as to enable the subsequent condensation operation to be more symmetrical. For example, the padding out may be done by a bit generator. In practice, the first extra bit has the value 1, while the subsequent extra bits are given the value 0.

In a preferred embodiment of the invention, the set of data to be processed is broken down into pairs b of groups each constituted by a first group G1 constituted by M first words each formed by the same number B of bits, and a second group G2 constituted by M second words each formed by the same number B of bits. The processor means then selectively repeat the preceding operations for each pair b of groups G1 and G2 obtained in this way until only one group of result words C remains, which group of words constitutes the said condensed data block C.

Figure 9:
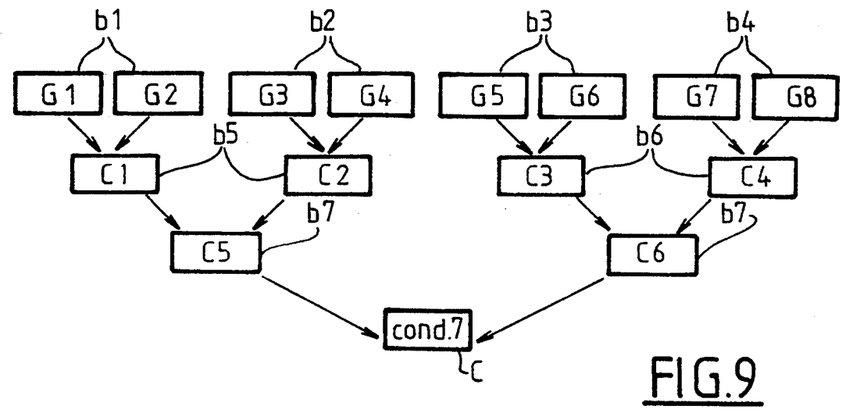
FIG. 9 is a diagram showing how the set of digital data to be processed is broken down into pairs of groups each comprising M.B elementary data items.

FIG. 9 shows an example of condensing four pairs b of groups of words.

This is done by recurrence processing on an inverse binary tree. More precisely, the first pair b1 of word groups G1 and G2 is transformed into a condensed block C1. The second pair b2 of word groups G3 and G4 is transformed into a condensed block C2. The third pair b3 of word groups G5 and G6 is transformed into a condensed block C3 and the fourth pair b4 of word groups G7 and G8 is transformed into a condensed block C4. Thereafter, the pair b5 of condensed blocks C1 and C2 is transformed into a condensed block C5, and the pair b6 of condensed blocks C3 and C4 is transformed into a condensed block C6. Finally, condensed blocks C5 and C6 are transformed into a condensed block C7 representative of the result condensed data block C for word groups G1 to G8.

Figure 10:
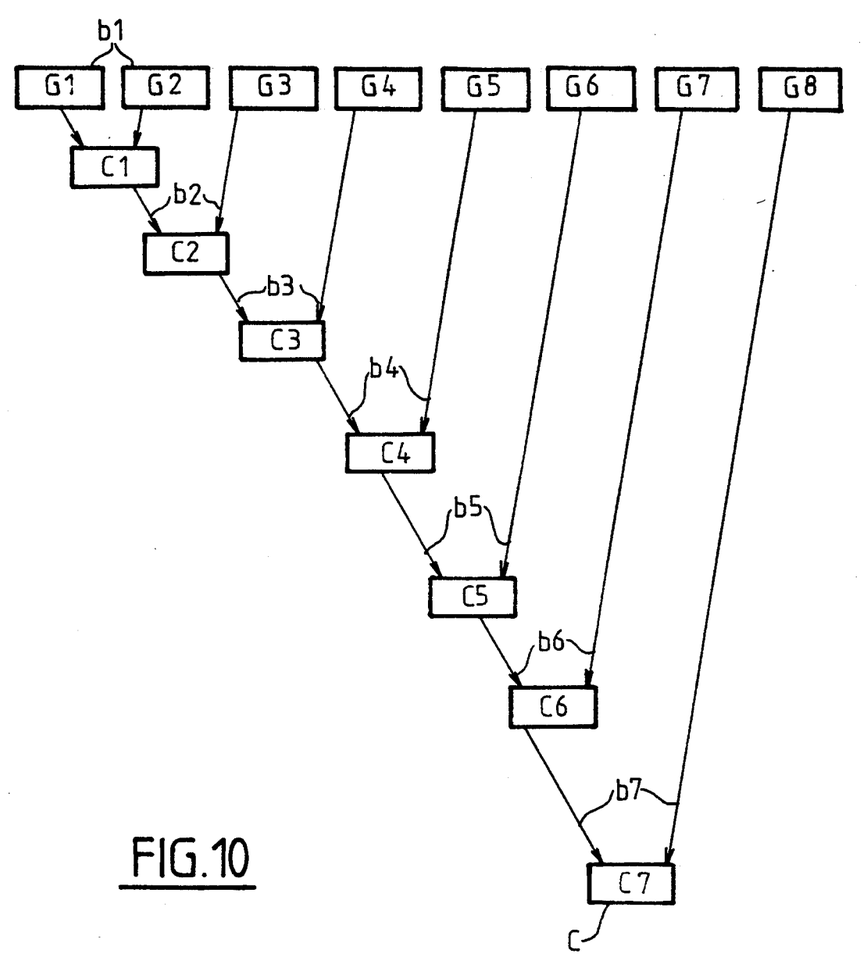
FIG. 10 shows another example of how the set of digital data to be processed is broken down into pairs of groups each comprising M.B elementary data items.

FIG. 10 shows an example of processing eight word groups. In this case, the processing is serial. More precisely, the pair b1 constituted by groups G1 and G2 is transformed into a condensed block C1. The pair b2 constituted by condensed block C1 and group G3 is transformed into a condensed block C2, and so on until the pair b7 formed by condensed block C6 and group G8 is transformed into a condensed block C7 representative of the result condensed data block C for word groups G1 to G8.

The digital data condensation device described with reference to FIGS. 1 to 10 may be used in numerous digital data security applications because of its non-falsification property.

For example, the digital data condensation device of the invention may be applied to certification devices or to devices for verifying the integrity of computer files. The operation of condensing digital data as described with reference to FIGS. 1 to 10 is used initially to calculate the condensed block representative of the files to be protected. The resulting condensed block is stored in non-volatile memory of the Read Only Memory type (ROM). Thereafter, each time the file to be protected is used, its condensed block is recalculated using the data condensation operation described with reference to FIGS. 1 to 10. By comparing the condensed block obtained in this way with the previously-stored condensed block, it is possible to determine whether the files to be protected contain possible corruption or anomalies.

Figure 11:
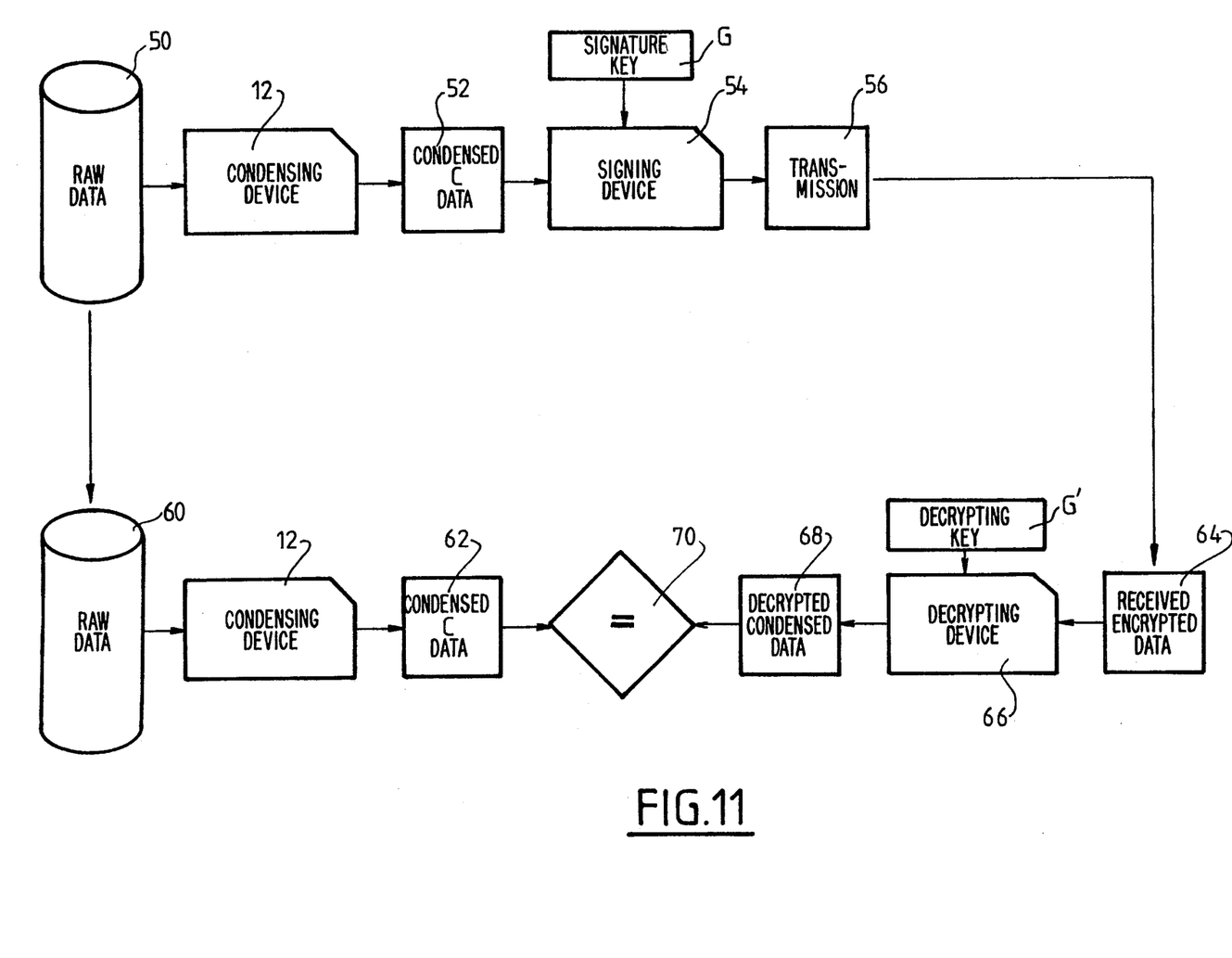
FIG. 11 is a diagram showing how the device of the invention may be applied to authentication devices.

FIG. 11 shows an application of the digital condensation device of the invention to signature devices.

The data to be processed 50 is transformed by the digital data condensation device 12 described with reference to FIGS. 1 to 10 to obtain a result condensed data block 52. This result condensed data block C is signed by means of a signature function which depends on a secret key G. The secret key G may be known solely to the signatory (public key signature) or both to the signatory and to the addressee (secret key signature). The data 54 condensed in this way and then signed, together with the data 50 are transmitted via some means 56.

On reception, the data as received 60 is condensed by a condensing device 12 of the invention to obtain a new condensed block 62. Similarly, the condensed and signed data as received at 64 is decrypted using a signature verifying function that depends on a secret key G'. The function G' is a secret key function if the initial signature is of the secret key type, or it is a public key function if the signature is of the public key type. Thereafter, the result of comparing 70 the condensed block 62 with the decrypted condensed block 68 serves to verify the signature of the digital data.

In a variant, the secret key signature may be performed on the basis of the condensation operation described with reference to FIGS. 1 to 10.

We claim:

1. An electronic device for processing digital data, the device comprising:

an input for receiving data to be processed; and processor means for transforming input data in a non-falsifiable manner into a result condensed data block;

wherein the processor means comprise:

means for breaking the input data into at least a first group comprising M first input words with respective ranks I lying in a range from 1 to M each of the first input words having a same number B of elementary data items, and a second group comprising M second input words of respective ranks I lying in the range 1 to M, each of the second input words having the same number B of elementary data items;

first means forming a first array having entries of sizes M and V where V is a predetermined value representing an upper limit of a processing index K, contents of cells in the first array having integer values lying in a range 1 to 2M;

second means forming a second array having entries of respective sizes M and V, the second array having cells whose contents take integer values lying in the range 1 to 2M;

third means forming a third array having entries of respective sizes V and M, the third array having cells containing integer values lying in a range 1 to $2^B$ to define an auxiliary table of V.M auxiliary words; and a composite operator for providing a special function having entries of the same size B, thereby performing an EXCLUSIVE OR operation on the entries followed by a non-linear permutation on a result of said EXCLUSIVE OR operation;

and wherein the processor means are operable for:

a) initializing the processing index K to 1;

b) establishing an initial value of a current intermediate word at rank I equal to 1;

c) initializing the rank I to 2;

d) replacing the input word of the first group of rank I with the input word whose group and rank are defined by the contents of a cell in the first array whose entry address of size M is equal to the rank I, thus obtaining a first substitute word;

e) replacing the input word of the second group of rank I by the input word whose group and rank are defined by the contents of a cell of the second array whose entry address of size M is equal to the rank I, thereby obtaining a second substitute word;

f) applying the second substitute word and an auxiliary word contained in a cell of the auxiliary table whose entry address of size M has a value equal to the rank I to respective entries of the composite operator, thereby obtaining a first term word;

g) applying the first substitute word and the first term word to respective entries of the composite operator, thereby obtaining a second term word;

h) applying the current intermediate word and the second term word to respective entries of the composite operator, thereby obtaining a new current intermediate word;

i) repeating operations d) to h) selectively, and for each repetition incrementing the rank I until the value M is reached, thereby obtaining a result word of B elementary data items for a processing index of value K;

j) selectively repeating operations b) to i), and for each repetition incrementing the processing index until reaching an upper limit, thereby obtaining a result condensed data block of V result words each comprising B elementary data items.

2. A device according to claim 1, wherein the processor means, in order to establish the initial value of the current intermediate word for a rank I equal to 1, are operable for:

replacing the input word of the first group of rank I by the input word whose group and rank are defined by the contents of the cell in the first array whose entry address of size M is equal to the rank I, thereby giving a third substitute word;

replacing the input word of the second group of rank I by the input word whose group and rank are defined by the contents of the cell of the second array whose address of the entry of size M is equal to the rank I, thus giving a fourth substitute word;

applying the fourth substitute word and the auxiliary word contained in the cell of the auxiliary table whose address in the entry of size M has a value equal to the rank I to respective entries of the composite operator, thus providing a third term word; and applying the third substitute word and the third term word to respective entries of the composite operator, thereby obtaining the initial intermediate word for a rank 1.

3. A device according to claim 1, wherein the upper limit V of the processing index K is equal to M.

4. A device according to claim 1, wherein the composite operator possesses a third array having entries of sizes $2^{B1}$ to $2^{B2}$ respectively, such that B1 and B2 are non-zero integers whose sum is equal to B, the array having cells with contents having values lying in the range 1 to $2^B$ suitable for defining a non-linear permutation on |0, 1| order B product set extended to 2.M words, and an EXCLUSIVE OR type operator having entries of the same size B, an output from the EXCLUSIVE OR operator interacting with the entries of the third array to provide a special function.

5. A device according to claim 1 wherein the length of a set of data to be processed does not equal 2.M.B elementary data items, and wherein the device further includes additional processor means comprising:

means for padding out a length of the set of data to be processed to obtain a length equal to a multiple of M.B elementary data items and greater than 2 M.B elementary data items, thereby enabling a plurality of groups to be obtained, each group comprising M words respectively formed of a number B of elementary data items;

means operable for selectively repeating operations a) to j) by applying on each repetition a pair of word groups of M.B elementary data items until only one result word group is obtained having M.B elementary data items;

said result word group being the result condensed data block.

6. A device according to claim 5, wherein the selective repetition of operations a) to j) on the plurality of word Groups of M.B elementary data items takes place in accordance with an inverse binary tree.

7. A device according to claim 1 wherein said electronic device comprises a device for certifying or signing digital data.

* * * * *